(12) United States Patent
Barton et al.

(10) Patent No.: US 7,515,663 B2
(45) Date of Patent: Apr. 7, 2009

(54) METHOD AND APPARATUS FOR SYNCHRONISING RECEIVERS

(75) Inventors: Stephen Kingsley Barton, Manchester (GB); Robert Barnard Heaton, Aldershot (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 671 days.

(21) Appl. No.: 10/210,104

(22) Filed: Aug. 2, 2002

(65) Prior Publication Data

US 2003/0112911 A1 Jun. 19, 2003

(30) Foreign Application Priority Data

Aug. 2, 2001 (EP) ................................. 01306646

(51) Int. Cl.
*H04L 7/00* (2006.01)
(52) U.S. Cl. ...................................... 375/354; 375/343
(58) Field of Classification Search ................. 375/365, 375/130, 141, 142, 150, 354, 343–344; 370/480
See application file for complete search history.

(56) References Cited

U.S. PATENT DOCUMENTS

| 4,121,295 | A | * | 10/1978 | Witt ............................ 708/493 |
| 4,559,606 | A | * | 12/1985 | Jezo et al. .................... 708/425 |
| 4,559,607 | A | * | 12/1985 | Lu .............................. 708/422 |
| 4,599,732 | A | * | 7/1986 | LeFever ....................... 375/346 |
| 5,347,535 | A | * | 9/1994 | Karasawa et al. ........... 370/342 |
| 5,361,276 | A | * | 11/1994 | Subramanian ............... 375/150 |
| 5,572,552 | A | * | 11/1996 | Dent et al. ................... 375/343 |
| 5,677,930 | A | * | 10/1997 | Bottomley ................... 375/150 |
| 5,727,018 | A | * | 3/1998 | Wolf et al. ................... 375/149 |
| 5,768,307 | A | * | 6/1998 | Schramm et al. ............ 375/150 |
| 6,094,450 | A | * | 7/2000 | Shockey ...................... 375/141 |
| 6,115,413 | A | * | 9/2000 | Lattard et al. ............... 375/130 |
| 6,256,338 | B1 | * | 7/2001 | Jalloul et al. ................ 375/142 |
| 6,356,608 | B1 | * | 3/2002 | Atarius ........................ 375/362 |
| 6,389,079 | B2 | * | 5/2002 | Raheli et al. ................ 375/262 |
| 6,426,982 | B1 | * | 7/2002 | Yang et al. .................. 375/343 |
| 6,498,939 | B1 | * | 12/2002 | Thomas .................... 455/562.1 |

(Continued)

FOREIGN PATENT DOCUMENTS

EP 0 371 357 6/1990

(Continued)

*Primary Examiner*—Jean B Corrielus
(74) *Attorney, Agent, or Firm*—Birch, Stewart, Kolasch & Birch, LLP

(57) ABSTRACT

A receiver produces complex data samples from a demodulated received signal. The data samples, which may form a preamble identifying a wireless LAN data burst, are arranged in a sequence comprising sub-sequences having a predetermined relationship with each other. A tuning frequency offset is determined by delaying the complex data samples by a plurality of different delay periods, auto-correlating the complex data samples using said different delay periods in order to produce respective auto-correlation outputs, determining a plurality of phase-dependent values each dependent upon phase errors in a respective auto-correlation output and calculating a value representing frequency offset by combining the phase-dependent values in a weighted manner. The preamble can be recognised by using the same delay means. One matched filter is used to detect a particular sub-sequence, the output is fed to the delay means, and a second matched filter receives the outputs of the delay means to detect sub-sequences having the correct timing relationship.

12 Claims, 4 Drawing Sheets

U.S. PATENT DOCUMENTS

| | | |
|---|---|---|
| 6,510,186 B1 * | 1/2003 | Chen et al. .................. 375/343 |
| 6,556,167 B1 * | 4/2003 | Disselkoen et al. .... 342/357.06 |
| 6,990,502 B2 * | 1/2006 | Waxman et al. .......... 707/104.1 |
| 2001/0019593 A1 * | 9/2001 | Greaves ...................... 375/355 |
| 2002/0009135 A1 * | 1/2002 | Omura et al. ............... 375/232 |
| 2002/0181509 A1 * | 12/2002 | Mody et al. ................. 370/480 |

FOREIGN PATENT DOCUMENTS

| | | |
|---|---|---|
| JP | 9-307599 A | 11/1997 |
| JP | 2863747 B1 | 12/1998 |
| WO | 00 59147 | 10/2000 |

* cited by examiner

METHOD AND APPARATUS FOR SYNCHRONISING RECEIVERS

FIELD OF THE INVENTION

This invention relates to a method and an apparatus for synchronising receivers. It is particularly applicable to wireless local area networks (LAN's) in which signals are transmitted in bursts, each of which is preceded by a known data pattern, or preamble, and which are detected by receivers and used for synchronisation purposes. Examples of such systems are HIPERLAN/2, MMAC and IEEE 802.11a. The invention will be described primarily in the context of HIPERLAN/2 systems, but it is applicable also in other areas.

HIPERLAN/2 (see for example "HIPERLAN/2—The Broadband Radio Transmission Technology Operating in the 5 GHz Frequency Band", by Martin Johnson, HIPERLAN/2 Global Forum 1999, v.1.0) is a centrally controlled time-division multiple access, time-division duplex (TDMA/TDD) system with the capability of sending data from a central access point (AP) to mobile terminals (MT's), receiving data from the MT's and synchronising the transmission of data directly between the MT's. The AP transmits bursts of data in the form of medium access control (MAC) frames, each of which comprises individual sections. The first individual section is a broadcast channel (BCH) section. It is important for the MT's to be able to recognise a BCH section quickly after the start of operation, so that they can synchronise their operation to the AP. For this purpose, the BCH section has, at the beginning, a preamble formed by a unique sequence of complex data. Other sections within the frame also include identifying preambles comprising different data sequences.

An individual preamble can be recognised by feeding the received data to a filter which is matched to the known complex data pattern.

However, it would be desirable to provide an improved technique for preamble detection which gives more reliable results even under extreme radio channel signal conditions exhibiting noise, multi-path interference and clipping. It would also be desirable to provide a technique which can be used for generating an accurate timing signal representing a predetermined point in the received transmission.

It would be further desirable to provide an advantageous technique for frequency synchronisation of the receiver.

It would also be desirable to combine at least some of these techniques in an efficient manner which allows common use of system components.

SUMMARY OF THE INVENTION

Aspects of the present invention are set out in the accompanying claims.

According to a further aspect of the invention, a specific data sequence, preferably representing a preamble, is detected by taking a sub-sequence and correlating it with a known sub-sequence pattern, for example by using a matched filter, and by detecting (e.g. by using a second matched filter) that the correlation output indicates that a plurality of such sub-sequences have occurred with the correct relative timings. This can provide reliable detection of the time at which the data sequence occurs without having to check every sample in every sub-sequence.

According to another aspect of the invention, a predetermined data sequence is fed to a plurality of auto-correlators of different delays, and the outputs of these are used in a weighted manner to determine a frequency offset value.

Preferably, both these aspects are used in a receiver which has a common delay means for providing samples to the matched filters and the auto-correlators.

BRIEF DESCRIPTION OF THE DRAWINGS

An arrangement embodying the invention will now be described by way of example, with reference to the accompanying drawings, in which.

DETAILED DESCRIPTION

Figure 1:
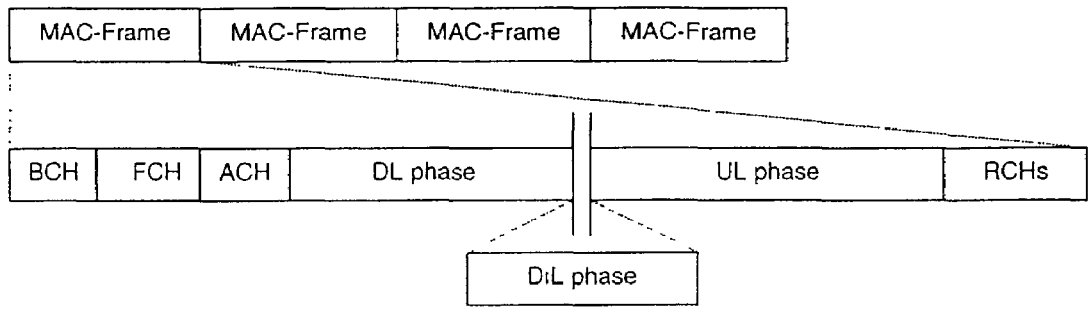
FIG. 1 illustrates the structure of a MAC frame transmitted using a HIPERLAN/2 system.

HIPERLAN/2 is a centrally controlled TDMA/TDD system with up-link, down-link and direct-link (i.e. data not needing to be relayed through the centre) burst timing all being controlled by the central Access Point (AP). Data is transmitted in medium access control (MAC) frames. All frame times are defined relative to a Broadcast Channel (BCH) burst, which is transmitted by the AP at the beginning of every new frame. FIG. 1 shows the frame structure for an AP with an omni-directional antenna.

Broadcast Channel (BCH), Frame Channel (FCH), Access feedback Channel (ACH) and down-link (DL) data are all transmitted as a single contiguous RF burst from the AP, but the individual sections are mapped on to separate data bursts that each have their own format and preamble. The remainder of the frame is used for transmissions by the Mobile Terminals (MT's). It is divided into three sections or phases: for Direct link (DiL) traffic (optional), up-link (UL) data from MT's to AP, and a random access channel (RCH) for requests to the AP to allocate resources to MT's that are not currently active.

The BCH, FCH and ACH channels are concatenated to form a single broadcast data burst. The DL data form a downlink burst. There are two different kinds of uplink bursts which can be used for the UL phase: up link bursts with short preambles (USCH) and uplink bursts with long preambles (ULCH). There is also an optional direct link burst for the DiL data.

The format is different for AP's with multiple antenna sectors. In this case each section of the frame comprises n data bursts, one for each antenna sector. Also, each broadcast burst includes only the BCH data. The FCH and ACH data are concatenated and transmitted as a downlink burst.

Independently of the burst type each data burst consists of two sections: preamble and payload. Each burst is started with a preamble section, $r_{PREAMBLE}$, which is followed by a payload section, $r_{PAYLOAD}$, and its baseband format is $$r_{BURST}(t) = r_{PREAMBLE}(t) + r_{PAYLOAD}(t - t_{PREAMBLE})$$

Figure 2:
FIG. 2 is a diagram showing the basic structure of a section within a MAC frame.

The time offset $t_{PREAMBLE}$ determines the starting point of the payload section of the burst and depends on the burst type. The basic structure of a data burst is illustrated in FIG. 2.

The payload section is made up of 52-carrier orthogonal frequency division multiplex (OFDM) symbols generated by a 64-point inverse Discrete Fourier Transform (EFT) with a cyclic prefix (CP) of 16 (mandatory) or 8 (optional) samples as indicated in Table 1.

TABLE 1

| Parameter | Value | |
|---|---|---|
| Sampling rate $f_s = 1/T$ | 20 MHz | |
| Useful symbol part duration $T_U$ | 64*T | |
| | 3.2 µs | |
| Cyclic prefix duration $T_{CP}$ | 16*T | 8*T |
| | 0.8 µs (mandatory) | 0.4 µs (optional) |
| Symbol interval $T_S$ | 80*T | 72*T |
| | 4.0 µs ($T_U + T_{CP}$) | 3.6 µs ($T_U + T_{CP}$) |
| Number of data sub-carriers $N_{SD}$ | 48 | |
| Number of pilot sub-carriers $N_{SP}$ | 4 | |
| Total number of sub-carriers $N_{ST}$ | 52 ($N_{SD} + N_{SP}$) | |
| Sub-carrier spacing $\Delta_f$ | 0.3125 MHz (1/Tu) | |
| Spacing between the two outmost sub-carriers | 16.25 MHz ($N_{ST} * \Delta_f$) | |

In the following description only the mandatory 16-sample CP is considered. Fine frequency offset and Fourier transform block timing may be tracked throughout the payload section of the burst using the delay-and-multiply auto-correlation technique proposed for DVB-T (Digital Video Broadcasting, Terrestrial) and ISDB-T (Integrated Services Digital Broadcasting, Terrestrial). However, as there are only 16 (or 8) samples of CP per symbol, it will be necessary to average over several symbols before these estimates are sufficiently accurate. The purpose of the preamble is to assist the initial acquisition process so that the first data symbol of the payload may be received with sufficient accuracy.

The data bursts have different preambles. There are three types of preamble sections which are used for constructing the preambles, section types A, B and C. Each preamble is made up of one, two or three sections of different types. Each section comprises multiple sub-sequences (or blocks) of data. Each sub-sequence comprises a set of samples.

The sub-sequences within a section type A each comprise a predetermined sub-sequence of 16 complex data samples, or the sign-inverse of these data samples (the term "sign-inverse" meaning that the signs of both the real and imaginary parts of the respective samples are the opposite of the signs of the corresponding samples of the basic data sequence). Within a section of type A, each individual sub-sequences of data is referred to as A, or, if it comprises sign-inverse samples, as IA. There are five sub-sequences, the total length being 4 µs, equivalent to one OFDM symbol.

The sub-sequences within a section type B each comprise a predetermined sub-sequence of 16 complex data samples B, or the sign-inverse IB of these data samples. There are either five or ten sub-sequences, producing a length of 4 or 8 µs, equivalent to one or two OFDM symbols.

A section type C has a length equal to two full OFDM symbols and comprises two sub-sequences each containing complex data samples C plus a preceding sub-sequence in the form of a cyclic prefix (CP) which is a copy of the last part of the C sub-sequence.

Only the broadcast burst has a preamble containing section type A, which is intended for frame synchronisation and must therefore uniquely identify the beginning of the first burst in the frame. Section type B is intended for timing, and fine frequency recovery. Section C type is intended for channel estimation. Section types B and C are also found in other preambles.

Figure 3:
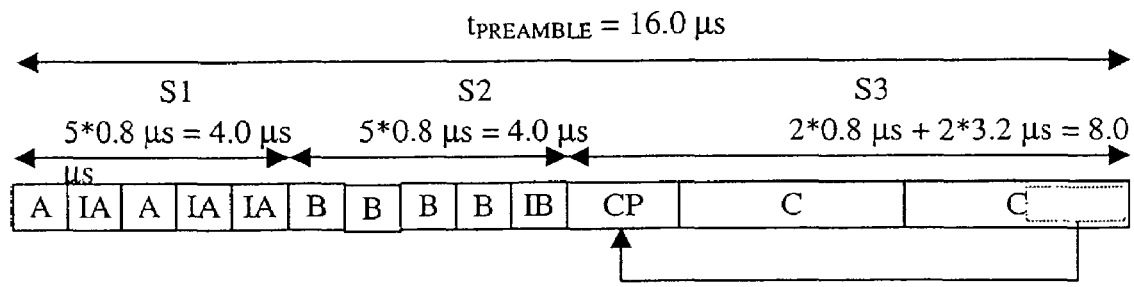
FIGS. 3 to 5 show the structures of different types of preambles used for respective types of sections of a MAC frame.

FIG. 3 shows the preamble for a broadcast burst, which includes three sections, of types A, B and C. Section type A of the broadcast burst preamble is shown at S1 and may be generated by taking the 64-point IFT of a spectrum having modulated non-zero carriers only in positions ±2, ±6, ±10, ±14, ±18 and ±22. The resulting time domain waveform repeats after 32 samples and the second 16 samples (IA) are the sign-inverses of the first 16 (A). It may therefore also be generated simply by storing the first 16 samples (A) in a look-up table. The complete section S1 of 80 samples (4 µs) is generated by attaching a further copy of the inverted 16-sample waveform IA to the end of the 64-sample IFT block.

Section type B of the preamble is shown at S2 and may be generated by taking the 64-point IFT of a spectrum having non-zero carriers only in positions ±4, ±8, ±12, ±16, ±20 and ±24. The resulting time domain waveform repeats after 16 samples (B). It may therefore also be generated simply by storing the first 16 samples in a look-up table. The complete section S2 of 80 samples (4 µs) is generated by repeating the 16-sample sub-sequence B four times, followed by a sign-inverted copy IB of the 16-sample waveform.

Section S2 is then followed by a C-type section at S3.

Figure 4:
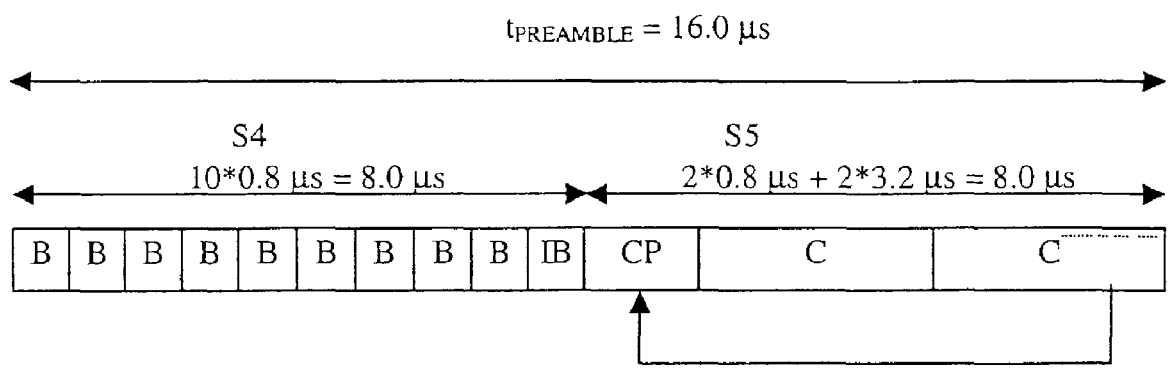

FIG. 4 shows the preamble for a ULCH burst. This comprises two sections S4 and S5, which are respectively section types B and C. The section type B is generated as in the broadcast burst, except that the 16-sample sub-sequence B is repeated 9 times before the sign-inverted waveform IB.

Figure 5:
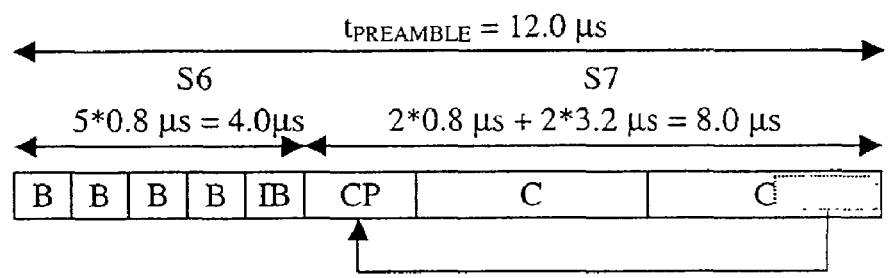

FIG. 5 shows the preamble for a USCH burst. This also has only two sections, S6 and S7, of types B and C, respectively. In this case, the type B section is the same as the B type section of the broadcast burst of FIG. 3.

The preamble for downlink bursts consists only of a section of type C, and the preamble for direct link bursts corresponds to the ULCH burst of FIG. 4.

Figure 6:
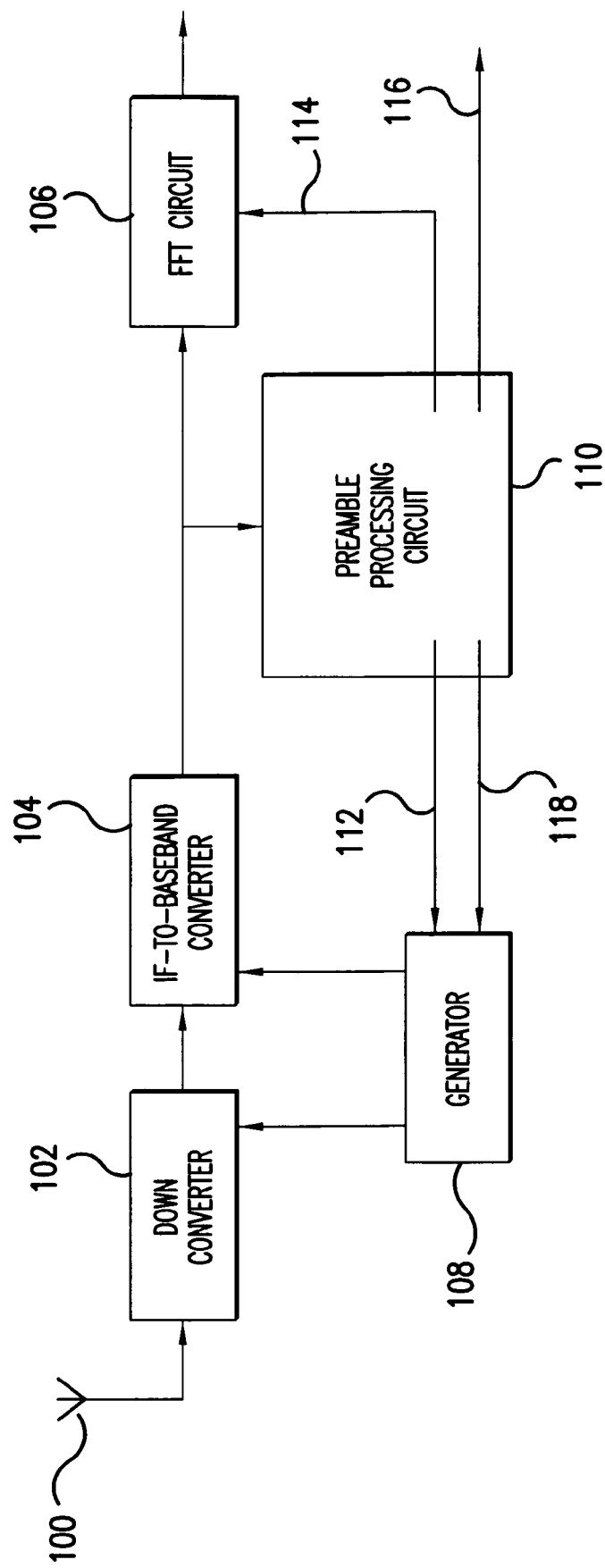
FIG. 6 is a block diagram of a wireless LAN receiver in accordance with the present invention.

Referring to FIG. 6, this is a block diagram of the receiving section of a wireless LAN transceiver. An antenna 100 is coupled to a down-converter 102 for demodulating the received signal and producing an intermediate frequency (IF) signal. The IF signal is passed to an IF-to-baseband converter 104 which produces at its output complex data samples which are delivered to a fast Fourier transform (FFT) circuit 106. Demodulated output data is produced by the FFT 106.

The down-converting operation and the IF-to-baseband conversion operation are controlled by a sampling clock generator and frequency synchronising circuit 108.

This arrangement is well known in the prior art for use in demodulating OFDM signals.

A preamble processing circuit 110 receives the complex data samples from the IF-to-baseband converter 104 and is arranged to detect predetermined data sequences forming different preambles and in response thereto to generate controlling signals. The processing circuit 110 has three functions: (a) to detect the presence of a predetermined data sequence representing a particular preamble, in response to which a "preamble detected" output is provided on line 116; (b) to detect accurately the time at which a preamble is received, and thereby provide on lines 112 and 114 a timing signal from which a timing error can be estimated for use by the generator 108 and the FFT circuit 106; and (c) to detect a tuning frequency error and in response thereto provide a value representing the error on line 118 for use by the generator 108 to correct the tuning frequency.

Figure 7:
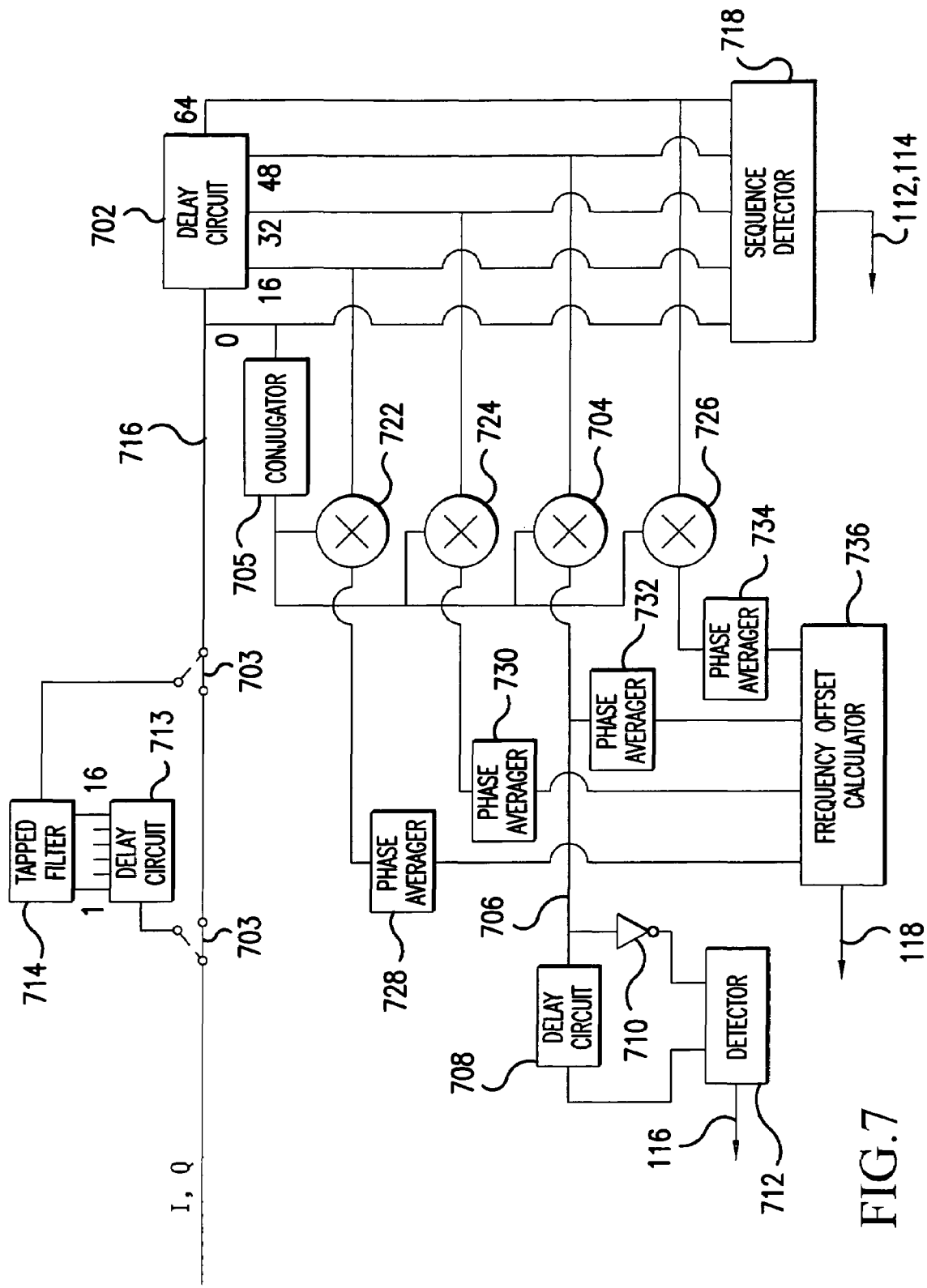
FIG. 7 is a schematic diagram of a preamble processing circuit of the receiver.

In the following, there will be described the ways in which the three primary functions of the preamble processing circuit 110 operate. Referring to FIG. 7, the real and imaginary samples I, Q from the converter 104 are fed to a 64-sample delay circuit 702 of the preamble processing circuit 110. The delay circuit 702 has a number of taps such that, out of 64 successive samples fed to the delay circuit 702, samples delayed by the following sample periods can be derived: 0, 16, 32, 48 and 64 (with the first and/or last possibly being derived from an output or input of the delay circuit 702). This delay circuit 702 is used for all three functions.

The first function, that of detecting a broadcast burst to enable the finding of the start of a frame, will now be described. The broadcast burst preamble, which has a preamble section of type A, must be distinguished from the other bursts, which do not. An auto-correlator is used for this purpose.

Table 2 shows the outputs which can be obtained from auto-correlators of different delays when fed with the samples forming a preamble section of type A.

TABLE 2

| Delay | A | IA | A | IA | IA | φ |
|---|---|---|---|---|---|---|
| 16 |   | −1 | −1 | −1 | +1 | πΔf/625 kHz |
| 32 |   |   | +1 | +1 | −1 | 2πΔf/625 kHz |
| 48 |   |   |   | −1 | +1 | 3πΔf/625 kHz |
| 64 |   |   |   |   | −1 | 4πΔf/625 kHz |

The numbers in column 1 represent the delays in terms of sample periods. The numbers in columns 2 to 6 represent the expected outputs of the auto-correlator for each block, or sub-sequence, of 16 samples when there is no frequency offset. For example, with a delay of 48 samples, the fourth block, IA, of an A-type section will have a correlation of −1 with the first block, A. The fifth block, IA, will have a correlation of +1 with the second block, IA.

Table 3 shows the outputs when fed with the samples forming a section of type B.

TABLE 3

| Delay | B | B | B | B | IB | φ |
|---|---|---|---|---|---|---|
| 16 |   | +1 | +1 | +1 | −1 | πΔf/625 kHz |
| 32 |   |   | +1 | +1 | −1 | 2πΔf/625 kHz |
| 48 |   |   |   | +1 | −1 | 3πΔf/625 kHz |
| 64 |   |   |   |   | −1 | 4πΔf/625 kHz |

In this case, with a delay of 48 samples, the fourth block, B, of the section will have a correlation of +1 with the first block, B. The fifth block, IB, will have a correlation of −1 with the second block, B.

By comparing Tables 2 and 3, it will be observed that correlators having delays of 16 or 48 samples can distinguish between sections of types A and B, whereas correlators with delays of 32 or 64 samples cannot.

The present embodiment operates by using a correlator with a delay (in this case 48 samples) resulting in distinctive outputs for A and B type sections, together with means for detecting the particular correlator output sequence expected for an A type section. In addition, the embodiment operates by checking for the presence of a B type section after an appropriate delay following the sensing of the A type section.

Sample 0 is fed to a conjugator 705 to form the complex conjugate of the sample. This, and sample 48 from the delay circuit 702, are fed to a multiplier 704, the output of which thus forms, on line 706, an auto-correlation of the received samples with a delay of 48 sample periods. Accordingly, assuming that a broadcast burst preamble is being received, then as indicated in Table 2 the output of the auto-correlator 704 should a produce a value of −1 for 16 consecutive samples, followed by a value of +1 for the next 16 samples. Means are provided for detecting this sequence of values and providing, on line 116, a preamble detection signal representing the broadcast burst preamble.

In the present embodiment, however, the preamble processing circuit 110 only produces such a detection signal if the detected section of type A is followed by a section of type B, with the leading ends of the A and B type sections separated by an 80 sample delay. This is achieved by feeding the output 706 of the auto-correlator 704 to an 80 sample delay circuit 708 and also to an inverter 710, the outputs of the delay circuit 708 and inverter 710 being fed to a detector 712. The detector 712 produces an output representing a broadcast burst preamble if it receives from the delay circuit 708 a succession of 16 outputs of "−1" followed by 16 outputs of "+1", at the same time that it receives the same values from the inverter 710 (which represent the inverse of the samples produced by auto-correlating a B type section, as indicated in Table 3).

The final columns in Tables 2 and 3 represent the phase offset φ introduced by a frequency error. Note that this increases linearly with the length of the correlator delay. If the frequency offset were sufficient to produce measured phases close to ±π/2, then a sub-sequence A could appear to be a sub-sequence B, and vice versa. It can be shown that, in a practical HIPERLAN/2 arrangement, this occurs at 104.25 kHz offset in the case of a 48-sample delay. HIPERLAN/2 specifies a frequency stability of ±20 ppm, which corresponds to ±114.5 kHz for a transmission frequency of 5.7125 GHz. In the worst case, where one end of the link has the maximum positive frequency offset and the other has the maximum negative offset, the difference could be as much as ±229 kHz.

Accordingly, if the above-described arrangement were to detect only a section type A, there would potentially be errors resulting from large frequency offsets. However, to avoid this, it is possible to arrange for the detector 712 to provide an output representing a broadcast burst preamble if it detects either (a) an auto-correlation output sequence suggesting a section type A followed 80 samples later by a section type B, or (b) the inverse of such an auto-correlation output, which would occur only if the frequency offset is sufficient that a section type A produces an auto-correlation output which resembles that of a section type B, and vice versa.

The second function of the processing circuit 100, to detect accurately the time at which a broadcast burst preamble is received, will now be described.

Switches 703 are operated so that the input samples are fed to a 16-tap delay circuit 713, the outputs of which are fed to a matched filter 714, matched to the 16-sample sub-sequence A. The output 716 of the tapped filter 714 will provide a signal representing the presence of a sub-sequence A at the outputs 1 to 16 of the delay circuit 713, because it represents a correlation between the received samples and the known pattern A.

This correlation output is thus fed to the input of the delay circuit 702, instead of the input samples. As indicated above, the delay circuit 702 has five outputs providing samples which are separated from each other by 16 sample periods. A further circuit 718 is used to check that these outputs represent corresponding samples in the five sub-sequences which collectively form a preamble section A.

Thus, the outputs 0, 16, 32, 48 and 64 are provided to respective inputs of a sequence detector 718, which may also be a filter matched to the expected pattern of the correlation output. The sequence detector of the preferred embodiment simply has weighting coefficients of +1, −1, +1, −1 and −1 applied to the input receiving samples 64, 48, 32, 16 and 0, respectively, to correspond with the relative signs of the values of the samples in the five respective blocks A, IA, A, IA and IA.

On detection of a section of type A, the detector 718 provides a timing signal on lines 112, 114 at an accurate timing.

The sequence detector 718 and delay circuit 702 will effectively combine the output of the matched filter (714) to produce an equivalent matched filter of length 80, but without requiring 80 separate delay circuit outputs and corresponding coefficients. Such a matched filter will give a signal-to-noise-ratio enhancement of 19 dB relative to the average sample, and hence a very reliable start-of-frame indication. This will give an excellent initial timing estimate for the broadcast burst as well as frame synchronisation.

The processing circuit 110 can also be arranged to detect the time of occurrence of a section of type B, by changing the coefficients of the matched filter 714 to correspond with a sub-section B, and by changing the weighting coefficients applied by detector 718 to samples 64, 48, 32, 16 and 0 to, respectively, +1, +1, +1, +1 and −1.

The third function of the processing circuit 100, to detect errors in the receiver tuning frequency, will now be described. For this function, the switches 703 are put in the positions shown in FIG. 7, so that the input samples are fed directly to the delay circuit 702.

As indicated in Table 2, assuming that there is no frequency offset, then an auto-correlator will produce outputs of known phase (either 0 or $\pi$) in predetermined sequences dependent upon the auto-correlator delay. However, if there is a frequency offset, this will result in a phase shift in the output of the auto-correlator. Assuming the frequency offset is $\Delta f$, then the phase shift $\phi$, in an HIPERLAN 2 system, is shown in column 7 in Table 2. The phase shift $\phi$ is proportional to the auto-correlator delay.

The frequency offset can therefore be determined from the observed phase shift in the outputs from an auto-correlator of known delay. According to the present embodiment, however, an improved signal-to-noise ratio is achieved by appropriately combining the outputs of a plurality of correlators having different delays.

The preamble processing circuit 110 has three further multipliers, 722, 724 and 726. All four multipliers receive the complex conjugate of input sample 0 from conjugator 705. The multipliers 722, 724, 704 and 726 receive, as their other inputs, samples 16, 32, 48 and 64, respectively. Therefore, the outputs of the multipliers 722, 724, 704 and 726 are, respectively, auto-correlations with delays of 16, 32, 48 and 64 samples.

The auto-correlator outputs are fed to respective phase averagers 728, 730, 732 and 734. Each phase averager produces an output value representing the average of the difference between the phases of the received input auto-correlation samples and the expected phases. (These expected phases could be determined from a look-up table which is addressed in accordance with the particular sub-sequence currently being received, which may for example be determined by the output of the detector 718.)

With the 64-sample delay there are only 16 output samples to average, giving a signal to noise ratio (SNR) of 12 dB, ignoring thermal noise. With a 48-sample delay there are 32 output samples to average, giving a signal to noise ratio of 15 dB. However, the phase to be estimated is now only ¾ of the corresponding phase output from the 64-sample delay correlator, producing a 2.5 dB penalty for small angles. With a 32-sample delay there are 48 output samples to average, which would give a signal-to-noise ratio of 16.8 dB if they were all statistically independent. However, the phase to be estimated is now only ½ of the corresponding phase output from the 64-sample delay correlator, producing a 6 dB penalty for small angles. There is a further penalty, which comes from the partial correlation between outputs generated by multiplying samples in the third section by those in the other two sections. The resulting SNR will therefore likely be less than 16.8 dB. Similar arguments may be applied to the 16-sample delay correlator, which, if all outputs were statistically independent, would give an 18 dB SNR, but a 12 dB penalty for the reduced angle. In this case there will be partial correlation between each block of 16 samples and its neighbor on either side, leading to a further expected reduction in SNR.

By suitably combining the outputs of up to four correlators using different delays of 16, 32, 48 or 64 samples, if all the outputs were statistically independent, there would be ten blocks of 16 outputs to average, giving a 10 dB increase in SNR over the 64-sample correlator case.

This is achieved by feeding the outputs of the phase averagers 728, 730, 732 and 734 to weighting inputs of a frequency offset calculator 736. The calculator 736 multiplies the average phase angle offset from the phase averager 728 (coupled to the 16-sample delay correlator 722) by a factor of 4; the output of the phase averager 730 coupled to the 32 sample delay correlator 724) by a factor of 2; the output of the phase averager 732 (coupled to the 48 sample delay correlator 704) by 1.5; and the output of the phase averager 734 (coupled to the 64 sample delay correlator 726) by unity. The weighted values are then themselves averaged to produce a phase offset value $\phi$, and the frequency offset calculator 736 produces on line 118 a value $\Delta f$ representing the frequency offset and derived using the formula $\Delta f = \phi \times 625/\pi$.

It is to be noted that, in addition to the partial correlations along the top two rows of Table 2 identified above, there will also be partial correlations between blocks in the same column of Table 2, which share the same real-time input, and between blocks in the same diagonal, which share the same delayed input. Each sub-section appears four times in the table in total. It is likely that this approach would give some diversity gain, as a "good" sample has several chances of being multiplied by another "good" sample and is not "wasted" by being paired with a "bad" sample in a particular fixed length correlator. However, there is a substantial increase in complexity in additional multipliers and in the combining circuits that must take account of the different phase angles.

The calculated frequency offset may be used for other purposes than adjusting the timing frequency; for example it could be used to enable the FFT circuit 106 to compensate for a tuning offset.

It will be noted that common elements, in particular the delay circuit 702, can be used for all three functions of the preamble processing circuit 110. Other elements, such as the multiplier 704, can also be shared between functions.

In the arrangement described above, the delay circuit 702 is used at different times for delaying both the input samples (for the first and third functions mentioned above) and the correlation of the input samples as derived by matched filter 714 (for the second function). If desired, and particularly if simultaneous performance of these functions is required, two separate delay circuits could be used instead.

In the above-described embodiment, it is intended that the tuning frequency offset determination and the preamble timing detection operation be carried out in the initial stages after the receiver starts to operate, subsequent synchronisation being carried out by other arrangements which are known per se. Instead, however, the frequency offset determination and/ or the preamble timing determination can be performed repeatedly during operation of the receiver.

As indicated, each of the circuits 714 and 718 may take the form of a matched filter. However, other types of pattern recognition circuits may be used to recognise a received sample sequence, for example by correlation with the known sequence. The circuit can be constructed using digital logical circuitry, such as X-OR gates, or in a more complex manner, for example in the form of a neural network which may be implemented in software or hardware. As indicated above, however, the detector 718 can be of a simple structure, requiring only a small number (five) in this embodiment) of weighting coefficients, which are preferably alterable in order to detect different preambles.

It will be noted that any one or more of the three functions mentioned above could be omitted. For example, the output of the detector 718 may be used to indicate the receipt of a broadcast burst preamble, thus obviating the need for the circuits 708, 710 and 712.

In the case of wireless local area networks, in conventional arrangements reliable and accurate synchronisation is rendered difficult, as the signals are not transmitted continuously. The present invention mitigates these problems. The techniques could be used in other situations in which similar conditions apply, such as satellite burst mode communications and burst mode power line communications.

The invention may be implemented using discrete hardware or a programmed microprocessor or a combination of both.

The invention claimed is:

1. A method of determining a tuning frequency offset in a receiver which produces complex data samples from a demodulated received signal, the data samples being arranged in a sequence comprising sub-sequences having a predetermined correlation relationship with each other, the method comprising:
    delaying using a delay unit the complex data samples by a plurality of different delay periods to produce a plurality of delayed complex data sample sequences;
    auto-correlating the complex data samples with the plurality of delayed complex data sample sequences in order to produce respective auto-correlation outputs;
    determining a plurality of phase-dependent values each dependent upon phase errors in a respective auto-correlation output; and
    calculating a value representing frequency offset by combining the phase-dependent values in a weighted manner.

2. A method of synchronizing a receiver, the method comprising determining a tuning frequency offset using a method as claimed in claim 1 and using the delayed samples to detect a predetermined sequence of data samples.

3. A method as claimed in claim 2, further including the step of detecting the predetermined sequence by determining whether an auto-correlation of the data samples using one of said delayed complex data sample sequences results in a predetermined sequence of outputs.

4. A method as claimed in claim 2, further including the step of providing a signal indicating a time at which said predetermined sequence has occurred by forming a correlation of the complex data samples with data representing one of said sub-sequences, and using a pattern recognition unit responsive to the correlation for detecting said sequence comprising a plurality of said sub-sequences.

5. A method as claimed in claim 1, wherein the received signal comprises orthogonal frequency division multiplex (OFDM) symbols.

6. A method as claimed in claim 1, wherein the received signal is a high performance radio local area network version 2 (HIPERLAN/2) signal.

7. A method of synchronizing a receiver, the method comprising:
    sampling a received signal to detect a predetermined sequence of complex data samples, the predetermined sequence comprising sub-sequences at predetermined relative timings, wherein respective contents of the sub-sequences have predetermined correlation relationships with each other;
    forming a correlation of the complex data samples with data corresponding to one of said sub-sequences;
    delaying the correlation by respective different amounts associated with the predetermined relative timings using a delay unit; and
    providing a signal indicating the time at which said predetermined sequence of complex data samples has been received using a pattern recognition unit responsive to respective outputs of the delay unit and having weighting coefficients corresponding to said predetermined correlation relationships.

8. A method as claimed in claim 7, further including the steps of feeding the complex data samples to the delay unit, deriving multiple auto-correlations using respective different outputs of the delay means, and determining a tuning frequency offset from phase errors in the respective auto-correlations.

9. A method as claimed in claim 7 or 8, wherein the predetermined sequence identifies a data burst in a wireless local area network transmission.

10. A method as claimed in claim 7, wherein the pattern recognition unit is a matched filter.

11. A wireless local area network receiver comprising:
    a delay unit for delaying complex data samples by a plurality of different delay periods to produce a plurality of delayed complex data sample sequences;
    means for auto-correlating the complex data samples with the plurality of delayed complex data sample sequences in order to produce respective auto-correlation outputs;
    means for determining a plurality of phase-dependent values each dependent upon phase errors in a respective auto-correlation output; and
    means for calculating a value representing frequency offset by combining the phase-dependent values in a weighted manner.

12. A synchronizer for synchronizing a receiver, comprising:
    means for receiving a signal including a predetermined sequence of complex data samples, the predetermined sequence comprising sub-sequences at predetermined relative timings, wherein respective contents of the sub-sequences have predetermined correlation relationships with each other;
    means for forming a correlation of the complex data samples with data corresponding to one of said sub-sequences;
    delay means for delaying the correlation by respective different amounts associated with said predetermined relative timings; and
    pattern recognition means responsive to respective outputs of the delay means and having weighting coefficients corresponding to said predetermined correlation relationships for providing a signal indicating the time at which said predetermined sequence of complex data samples was received.

* * * * *